United States Patent [19]

Frelich et al.

[11] Patent Number: 5,338,386

[45] Date of Patent: Aug. 16, 1994

[54] METHOD FOR BONDING FABRIC TO SEAT CUSHION TRENCHES

[75] Inventors: Jeffrey J. Frelich, Redford; Ronald L. Miotto, Wayne; Ronald A. Wiltsey, Sterling Heights, all of Mich.

[73] Assignee: Lear Seating Corporation, Southfield, Mich.

[21] Appl. No.: 48,920

[22] Filed: Apr. 20, 1993

Related U.S. Application Data

[62] Division of Ser. No. 916,181, Jul. 17, 1992, Pat. No. 5,232,543.

[51] Int. Cl.⁵ .................. B32B 31/04; B32B 31/20; C09J 5/06
[52] U.S. Cl. ..................... 156/290; 156/308.8; 156/497
[58] Field of Search ............... 156/209, 245, 285, 290, 156/303.1, 308.4, 308.8, 497, 500, 579, 583.1, 583.8, 583.91; 100/233-236, 295, 92, 93 P; 264/86, 87, 231, 321, DIG. 14

[56] References Cited

U.S. PATENT DOCUMENTS

| | | | |
|---|---|---|---|
| 4,692,199 | 9/1987 | Kozlowski et al. | 156/245 |
| 4,795,517 | 1/1989 | Elliott et al. | 156/290 X |
| 4,844,761 | 7/1989 | Bracesco | 264/321 X |
| 4,975,135 | 12/1990 | Lowe | 156/245 X |

*Primary Examiner*—Michael W. Ball
*Assistant Examiner*—Adrienne C. Johnstone
*Attorney, Agent, or Firm*—Reising, Ethington, Barnard, Perry & Milton

[57] ABSTRACT

The assembly (10) includes a plurality of tubes (30) configured to fit into the trenches or indentations of a preformed seat cushion assembly (14). The plurality of tubes (30) rotate about pins (56) and force a fabric bag (12) and an adhesive layer located between the seat cushion assembly (14) and the fabric bag (12) into the trenches. Steam passes through the plurality of tubes (30) and out a plurality of holes (32) which are spaced along the plurality of tubes (30). The steam melts the adhesive layer which subsequently bonds the fabric bag (12) to the seat cushion assembly (14) within the trenches of the seat cushion assembly (14). A vacuum (40) is used to create a pressure differential between the passageways within the plurality of tubes (30) and the atmosphere, i.e., the seat cushion (15). The pressure differential is used to remove the steam and any water from the fabric bag (12) and seat cushion assembly (14) to prevent water damage thereto.

2 Claims, 3 Drawing Sheets

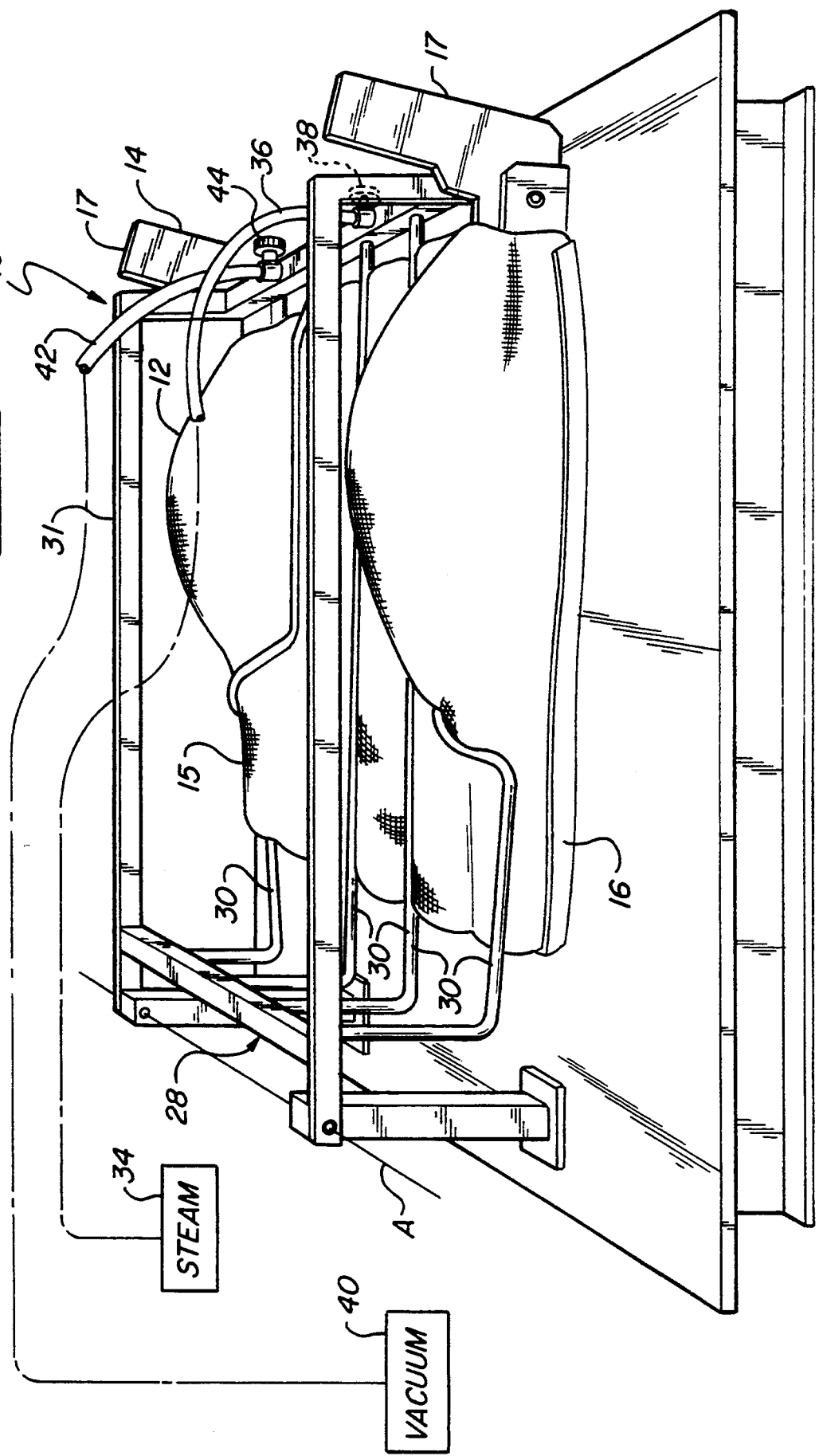

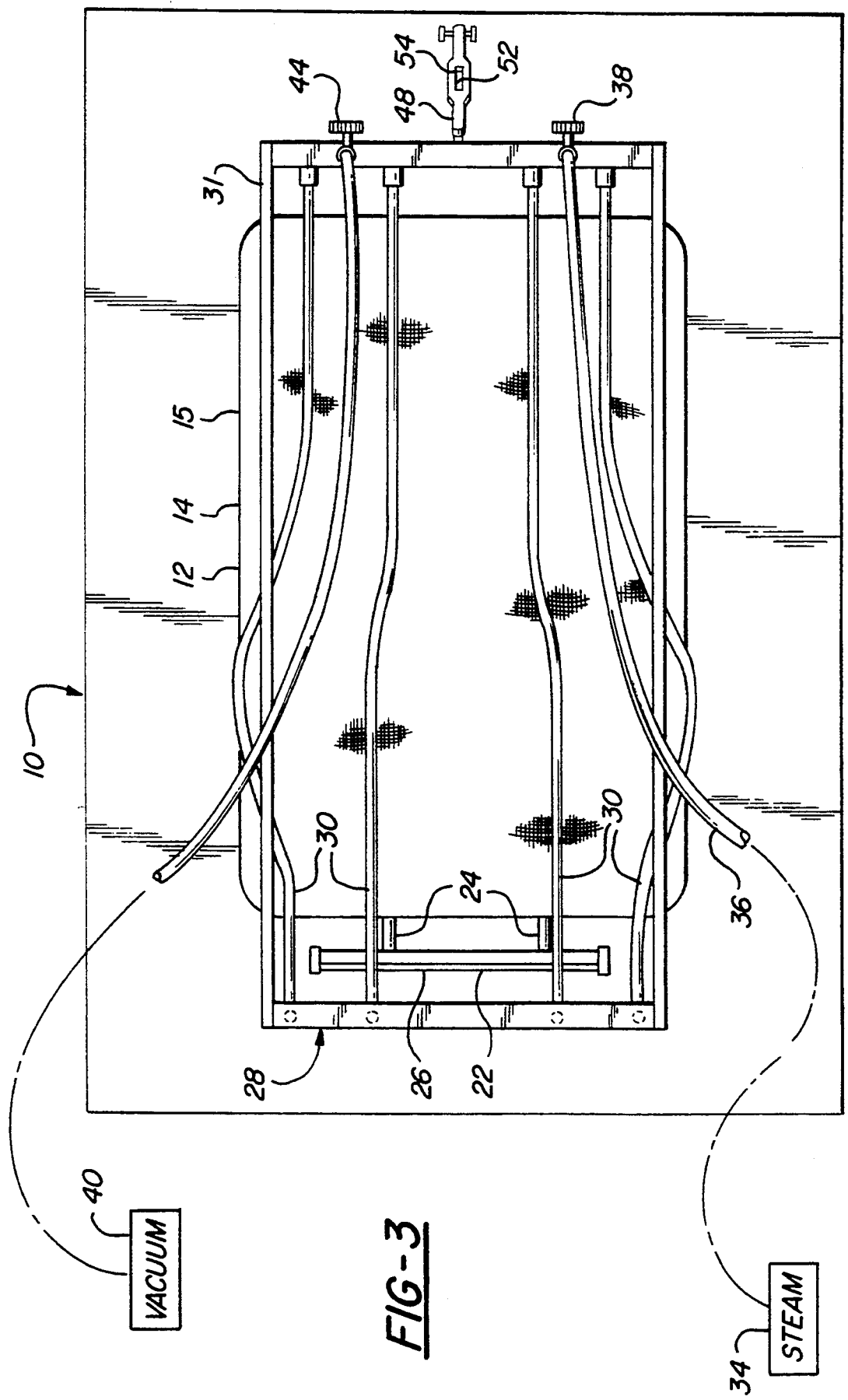

METHOD FOR BONDING FABRIC TO SEAT CUSHION TRENCHES

This is a divisional of copending application Ser. No. 07/916,181 filed on Jul. 17, 1992 now U.S. Pat. No. 5,232,543.

BACKGROUND OF THE INVENTION

1. Technical Field

The subject invention relates to a bonding assembly for bonding a laminate between two articles. More particularly, the subject invention relates to a bonding assembly which bonds portions of a laminate between a seat cushion and a decorative cover.

2. Description of Related Art

Fabric covered foam articles and methods for making same constitute a well-developed art in which a great deal of effort and expense have been directed. Fabric covered foam articles generated from this generally comprise a foam pad adhesively secured to a fabric covering. An example of such a method is shown in U.S. Pat. No. 4,692,199 issued Sep. 8, 1989 to Kozlowski which discloses a particularly well-adapted method for making a fabric covered foam article. Kozlowski '199 patent specifically discloses a method wherein vacuum pressure is applied to a porous contoured mold in order to draw an impervious adhesive film against a cloth fabric layer to conform the cloth fabric layer to the contours of a mold surface. A matching cellular foam pad is placed in mating engagement with the adhesive film as it is held to the contour of a mold surface by the vacuum pressure. The foam pad is compressed against the mold by a perforated platen and held in place as the vacuum pressure is discontinued. Steam is then supplied through the porous mold to heat and diffuse the adhesive film into the adjacent fabric layer and cellular foam pad for adhesively securing the two together. Vacuum pressure is then applied for removing moisture by drawing air through the perforations of the platen, the foam pad, the fabric layer and porous mold.

One drawback to methods for making fabric covered foam articles like that disclosed in Kozlowski '199 is that a portion of the completed article is not covered by the decorative fabric layer; that is, only the front and side portions of the article are fabric covered, leaving a backside surface uncovered. Thus, such methods are limited to applications wherein a backside surface of the article is not viewable. Typically, fasteners such as clasps or hooks are used to secure the fabric layer to such backside surfaces. If the backside surface of an article is viewable, a rigid plastic back panel may be secured to the backside of the article in order to hide the uncovered back portion from view. Unfortunately, decorative plastic cover panels and other remedial measures for covering the backside portions of articles made from this method significantly increase the cost of the article.

Reversible fabric bag techniques provide an attractive and inexpensive alternative to making fabric covered foam articles which overcome many of the deficiencies associated with prior art methods. The reversible fabric method generally includes utilizing a fabric layer in the shape of a bag. Fabric bag is reversed inside out and a portion of the inside of the bag is adhesively bonded to a pre-formed foam pad. Once the foam pad is bonded to the inside of the fabric bag, the fabric bag is turned right side out so as to enclose the foam pad therein. The resulting article provides an attractive fabric cover about the rear, side and front portions of the foam, thus avoiding the need for expensive decorative cover panels. Examples of reversible bag methods are shown in U.S. Pat. Nos. 5,000,805 to Lowe, 4,925,513 to Witzke, 4,740,260 to Selbert and 4,715,916 to Shamada.

Unfortunately, such reversible fabric bag methods are limited to applications wherein a fabric bag may be reversed. In other words, if the fabric bag may not be turned inside out, the reversible bag methods are not useful. For example, if the fabric bag material is inflexible or if the foam back includes a rigid portion such as a rigid frame encased therein, the fabric bag may not be capable of being reversed about the foam pad adhered to an inner portion thereof. In these situations, the aforementioned expensive remedial measures must be used, e.g., expensive decorative plastic back panels. Other remedial measures which may be used include the use of zippers and Velcro TM to secure fabric coverings to the backside surface of the article. Unfortunately, all these remedial measures significantly increase the cost of making such articles.

SUMMARY OF THE INVENTION AND ADVANTAGES

A bonding assembly bonds portions of a fabric bag to a seat cushion assembly such that the fabric bag may be manipulated to remove any wrinkles in the fabric bag prior to bonding the fabric bag to the seat cushion assembly. The bonding assembly comprises base means for positioning a seat cushion assembly within a fabric bag to be bonded thereto. Tubing means provides a passageway for fluids to pass therethrough. The tubing means is rotatable between an open position and closed position. The assembly is characterized by tubing means including a plurality of tubes disposed apart from each other such that portions of the fabric bag located between each of the plurality of tubes may be manually adjusted prior to bonding portions of the fabric bag located under the plurality of tubes to the seat cushion assembly.

The subject invention allows portions of a fabric bag to be fixedly attached to the seat cushion assembly while maintaining the ability to remove wrinkles from the fabric bag prior to bonding the fabric bag to the seat cushion assembly. Since many seat cushion assemblies are non-invertible due to the support structures located within the seat cushion assembly, the bonding assembly is used for removing the wrinkles in a fabric bag prior to bonding the fabric bag to the seat cushion assembly.

BRIEF DESCRIPTION OF THE DRAWING

FIG. 2 is a side perspective view of the preferred embodiment of the subject invention in the closed position with a seat cushion positioned for bonding; and FIG. 3 is a top view of the preferred embodiment of the subject invention in the closed position with a seat cushion locked therein.

DETAILED DESCRIPTION OF THE DRAWINGS

Figure 1:
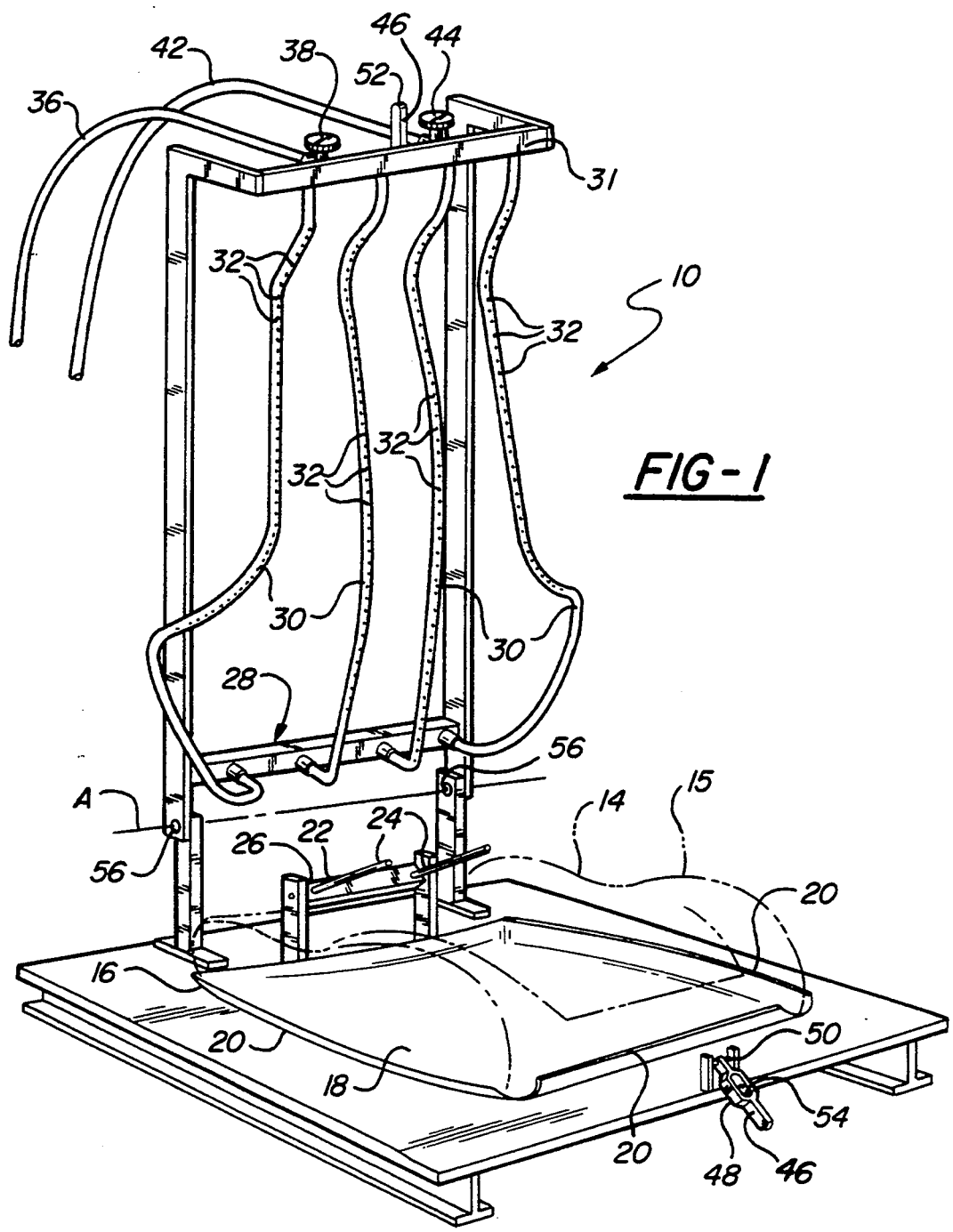
FIG. 1 is a perspective view of the preferred embodiment of the subject invention with a seat cushion shown in phantom.

The subject invention is a bonding assembly, generally shown at 10 in the FIGURES, for bonding portions of a fabric bag 12 to a seat cushion assembly 14 so the fabric bag 12 may be manipulated to remove any wrinkles in the fabric bag 12 prior to bonding the fabric bag 12 to the seat cushion assembly 14. The seat cushion assembly 14 includes a cushion 15 and inflexible support structure 17.

The bonding assembly 10 comprises base means 16 for positioning a seat cushion assembly 14, within the fabric bag 12, to be bonded thereto. The base means 16 includes a substantially flat structure 18 having the edges 20 folded upward so the seat cushion assembly 14 may be guided into the proper location. The base means 16 further includes headrest guide means 22 which aids in the proper alignment of the seat cushion assembly 14. The headrest guide means includes two pins 24 which are rotatably mounted to cross member 26. The two pins 24 are inserted into the two holes in the top of the seat cushion assembly 14 which will receive the stems of the headrest when the seat cushion assembly 14 is finally assembled. The two pins 24 aid in the proper alignment along with insuring that the holes at the top of the seat cushion assembly 14 are not covered during the bonding procedures.

Tubing means, generally shown at 28, provides a passageway for fluids to pass therethrough. The tubing means 28 is rotatable about longitudinal axis A between an open position and a closed position, shown in FIGS. 1 and 2, respectively.

The bonding assembly 10 is characterized by the tubing means 28 including a plurality of tubes 30 disposed apart from each other such that the portions of the fabric bag 12 located between each of the plurality of tubes 30 may be manually adjusted prior to bonding portions of the fabric bag 12 located under the plurality of tubes 30 to the seat cushion assembly 14. In other words, the plurality of tubes 30 are separated or spaced apart only connected at the ends by the frame 31. Therefore, an operator may reach between the plurality of tubes 30 to unwrinkle the fabric bag 12 before it is bonded to the seat cushion assembly 14.

The plurality of tubes 30 have predetermined lengths and a plurality of holes 32 spaced equidistant from each other along all of the predetermined lengths. Each of the plurality of tubes 30 may have a different contour and/or length, depending on the style of the seat cushion assembly 14. The plurality of holes 32 allow the fluids to pass between the passageway and the fabric bag 12. In other words, the holes 32 in the plurality of tubes 30 allow fluids passing through the passageways within the tubes 30 to exit and enter the passageways within the tubes 30 depending on the pressure differentials between the atmosphere, i.e., ambient pressure of the seat cushion 15, and the pressure within the passageways of the tubes 30.

The bonding assembly 10 further includes steam generating means 34 connected to the plurality of tubes 30 for generating steam and for transferring the steam through the plurality of tubes 30 and out the plurality of holes 32. The steam generating means 34 is a heat source which supplies heat through a heat line 36 or conduit to the plurality of tubes 30. More specifically, steam is generated and supplied to the plurality of tubes 30 through the passage 36 which is directly connected to the plurality of tubes 30 through valve 38. Depending upon the specific adhesive film being used, discussed subsequently, the heat supplied may be heated air or steam. The heated fluid is supplied to the plurality of tubes 30 via the passage 36.

The assembly 10 further includes vacuum means 40 connected to the plurality of tubes 30 for pulling fluid into the plurality of tubes 30 through the plurality of holes 32. A vacuum pump (not shown) supplies vacuum pressure to the plurality of tubes 30 by way of vacuum line 42 or conduit interconnecting therebetween. The vacuum line 42 is connected to the plurality of tubes 30 through valve 44.

Clamping means 46 clamps the plurality of tubes 30 onto the seat cushion assembly 14. The clamping means 46 is a clamp connected to the base 16 and to the plurality of tubes 30 wherein a rotatable member 48, connected to the base 16, rotates about a pin 50 and surrounds a pin 52 connected to the plurality of tubes 30. The rotating member 48 includes a hole 54 which receives the pin 52 therein. Hinge means 56 allows the tubing means 28 to rotate about the longitudinal axis A between the open and closed positions.

The seat cushion assembly 14 includes a pre-formed foam pad. The foam pad may be made from a variety of commonly known foam materials including polyurethane. The foam pad is preformed in a desired shape and contour by common foam forming techniques such as carving the desired foam shape out of the foam block or pouring foaming materials into specifically designed molds in order to form the desired shape.

An adhesive film (not shown) is a thin sheet having a thickness between 0.25 and 10 mils thick, but preferably between 1 and 1.25 mils thick. The film 12 is of the heat activated type so that the film 12 remains non-tacky, even slippery to the touch until heated. Upon heating, however, the film 12 forms an adhesive bonding material. Such heat activated films are well known in the art and they include polyimide films which are hydrophilic or, alternatively, may include polyester films which are activated by hot air. Two specific films have been found to work particularly well. The first is PT213, sold by Bemis, contactable at P.O. Box 314, Watertown, Mass. 02272. The second film is H1, sold by Autocem of 3 Parkway, Philadelphia, Pa. 19102.

The fabric bag 12 includes an opening for inserting the foam pad and adhesive film therein. The adhesive film may be preattached to the foam pad or it may be inserted into the fabric bag 12 after the foam pad is inserted therein. The fabric bag 12 may comprise any one of many fabrics currently utilized as decorative layers for upholstering seats in automotive vehicles. Preferably, a "breathable" fabric is chosen which allows air and moisture to pass therethrough. Examples of commonly known materials which may be used in the subject method include woven, knits and laminates. Such fabrics generally include fibers consisting of nylon and polyester materials, but may include natural fibers such as cotton. The fabric bag 12 may include surface effects, designs or other details thereon. The plurality of tubes 30 are typically designed to follow the contours in the seat cushion assembly 14. Said another way, the plurality of tubes 30 are bent to mirror the contour design, i.e., indentations and/or symbols, to assure the fabric bag 12 is adhered to the innermost portions of the indentations or contours of the seat cushion assembly 14.

The method for bonding the fabric bag 12 to the seat cushion assembly 14 includes the steps of placing the seat cushion assembly inside the fabric bag 12. The adhesive layer is placed between the seat cushion assembly 14 and the fabric bag 12. The fabric bag 12 is manipulated to remove all wrinkles. The plurality of tubes 30 are then lowered down over the seat cushion assembly 14 from the open position to the closed position. The rotating member 48 is then rotated about the pin 50 locking the plurality of tubes 30 on the seat cushion assembly 14. The fabric bag 12 is then further manipulated to remove any wrinkles which may have been produced by the lowering of the plurality of tubes 30 onto the seat cushion assembly 14.

Once all the wrinkles are removed, the steam valve 38 is opened, allowing steam to flow through the plurality of tubes 30 and out the plurality of holes 32. The heat from the steam activates the adhesive which then bonds the fabric bag 12 to the seat cushion assembly 14 at the portions of the fabric bag 12 located directly below the plurality of tubes 30.

After a sufficient amount of steam has activated the adhesive therebelow, the steam valve 38 is closed and the vacuum valve 44 is opened. The vacuum 40 then pulls all fluids, i.e., air, steam, and water, through the plurality of holes 32 back into the plurality of tubes 30. The vacuum 40 pulls the water and steam out from the seat cushion assembly 14 and the fabric bag 12, against the forces due to gravity, to prevent water damage to the seat cushion assembly 14 and/or the fabric bag 12.

Once all the steam and water has been removed from the seat cushion assembly 14 by the vacuum 40, the plurality of tubes 30 is unclamped and lifted to the open position. The seat cushion assembly, with the fabric bag 12 partially bonded thereto, is then removed for the subsequent step of completely bonding the fabric bag 12 to the seat cushion assembly 14 per steps well known in the art.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

We claim:

1. A method for bonding portions of a fabric bag (12) to a seat cushion assembly (14) with an adhesive layer located between the seat cushion assembly (14) and the fabric bag (12) using a plurality of holes (32) spaced equidistantly along a plurality of tubes (30) which are rotatable between open and closed positions with respect to a base (16) so the fabric bag (12) may be manipulated to remove any wrinkles in the fabric bag (12) prior to bonding, the method comprising the steps of:

placing the seat cushion assembly (14) inside the fabric bag (12);

aligning the seat cushion assembly (14) and the fabric bag (12) on the base (16);

rotating the plurality of tubes (30) from the open position to the closed position over the fabric bag (12) and seat cushion assembly (14) such that portions of the fabric bag (12) located between each of the plurality of tubes (30) may be manually adjusted while the plurality of tubes (30) is in the closed position;

transmitting steam through the plurality of tubes (30) in the closed position and out the plurality of holes (32) on to the portions of the fabric bag (12) to be bonded to melt the portions of the adhesive layer thereunder;

removing the steam and water from the fabric bag (12) and the seat cushion assembly (14); and rotating the plurality of tubes (30) to the open position.

2. The method as set forth in claim 1 further characterized by removing the steam and water by creating a pressure differential through the plurality of tubes (30).

* * * * *